United States Patent
Li et al.

(10) Patent No.: US 9,823,141 B2
(45) Date of Patent: Nov. 21, 2017

(54) SENSING DEVICE

(71) Applicant: INDUSTRIAL TECHNOLOGY RESEARCH INSTITUTE, Hsinchu (TW)

(72) Inventors: Szu-Ju Li, Changhua (TW); Jung-Hao Wang, New Taipei (TW); Hsin-Hung Pan, Yilan County (TW); Meng-Song Yin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/005,353

(22) Filed: Jan. 25, 2016

(65) Prior Publication Data

US 2016/0363489 A1 Dec. 15, 2016

(30) Foreign Application Priority Data

Jun. 12, 2015 (TW) ............................ 104119142 A

(51) Int. Cl.
*G01L 1/14* (2006.01)
(52) U.S. Cl.
CPC .................................. *G01L 1/146* (2013.01)
(58) Field of Classification Search
CPC ................................................... G01L 1/144
See application file for complete search history.

(56) References Cited

U.S. PATENT DOCUMENTS 4,719,538 A * 1/1988 Cox ..................... G01D 5/2417
361/283.2
5,406,848 A * 4/1995 Okada ..................... G01L 1/144
73/514.32

(Continued)

FOREIGN PATENT DOCUMENTS

CN 102564649 A 7/2012
EP 2549252 A2 1/2013

(Continued)

OTHER PUBLICATIONS

Fukang Jiang et al., A flexible micromachine-based shear-stress sensor array and its application to separation-point detection, Sensors and Actuators, 2000, 194-203, 79.

(Continued)

*Primary Examiner* — Lisa Caputo
*Assistant Examiner* — Tran M Tran
(74) *Attorney, Agent, or Firm* — Locke Lord LLP; Tim Tingkang Xia, Esq.

(57) ABSTRACT

A sensing device has a first substrate, a second substrate, a plurality of sets of first electrodes, a plurality of second electrodes, a plurality of first axis signal lines, a plurality of second axis signal lines, and a plurality of second signal lines. The second substrate is above the first substrate and has a reset structure. The second electrodes are on the first surface of the second substrate in array. Each set of first electrodes is on the first substrate in array, corresponding to one of the plurality of second electrodes, and having at least one first axis electrode and at least one second axis electrode. The first axis electrode and the second axis electrode both partially overlap with the corresponding second electrode.

7 Claims, 15 Drawing Sheets

(56) References Cited

U.S. PATENT DOCUMENTS

| | | | | |
|---|---|---|---|---|
| 5,421,213 | A * | 6/1995 | Okada | G01L 1/144 73/718 |
| 5,639,973 | A * | 6/1997 | Okada | G01L 1/144 73/862.043 |
| 6,053,057 | A * | 4/2000 | Okada | G01L 1/144 73/862.043 |
| 6,158,291 | A * | 12/2000 | Okada | G01L 1/144 73/862.043 |
| 6,483,480 | B1 * | 11/2002 | Sievenpiper | H01Q 3/44 343/700 MS |
| 6,675,656 | B1 * | 1/2004 | Plochinger | G01L 1/142 73/718 |
| 6,812,903 | B1 * | 11/2004 | Sievenpiper | H01Q 3/12 343/753 |
| 6,912,914 | B2 | 7/2005 | Pfeifer et al. | |
| 7,075,317 | B2 * | 7/2006 | Berting | G01D 5/2415 324/662 |
| 7,119,552 | B2 * | 10/2006 | Morimoto | G01L 1/144 324/661 |
| 7,119,705 | B2 * | 10/2006 | Manlove | G01L 1/144 177/144 |
| 7,142,500 | B2 * | 11/2006 | Fasen | G01D 5/2412 369/126 |
| 7,260,999 | B2 | 8/2007 | Divigalpitiya et al. | |
| 7,343,813 | B1 * | 3/2008 | Harrington | G01L 1/146 73/780 |
| 7,726,199 | B2 | 6/2010 | Shkel et al. | |
| 7,861,605 | B2 * | 1/2011 | Ogawa | G01L 1/14 73/862.69 |
| 8,629,841 | B2 | 1/2014 | Degner et al. | |
| 8,904,876 | B2 * | 12/2014 | Taylor | G01L 1/18 361/283.4 |
| 8,919,211 | B1 * | 12/2014 | Hanson | G01L 1/146 73/862.626 |
| 9,116,164 | B2 * | 8/2015 | Balachandran | G01P 15/125 |
| 9,134,189 | B2 * | 9/2015 | Hata | G01L 1/144 |
| 9,423,308 | B2 * | 8/2016 | Brookhuis | G01L 1/142 |
| 2007/0034007 | A1 * | 2/2007 | Acar | G01P 15/0888 73/514.01 |
| 2008/0105936 | A1 * | 5/2008 | Nakamura | G01D 5/2417 257/415 |
| 2008/0202251 | A1 | 8/2008 | Serban et al. | |
| 2010/0309145 | A1 | 12/2010 | Chiang et al. | |
| 2012/0019449 | A1 | 1/2012 | Yilmaz et al. | |
| 2012/0098783 | A1 | 4/2012 | Badaye et al. | |
| 2012/0137791 | A1 | 6/2012 | Kung et al. | |
| 2013/0056354 | A1 | 3/2013 | Kung | |

FOREIGN PATENT DOCUMENTS

| | | |
|---|---|---|
| JP | 2013096884 A | 5/2013 |
| TW | 201205404 A | 2/2012 |
| TW | 201209667 A | 3/2012 |
| TW | I385567 B | 2/2013 |
| TW | I434033 B | 4/2014 |
| TW | I448935 B | 8/2014 |

OTHER PUBLICATIONS

Hyung-Kew Lee et al., A Flexible Polymer Tactile Sensor: Fabrication and Modular Expandability for Large Area Deployment, Journal of Microelectromechanical Systems, 2006, 1681-1686, vol. 15, Issue: 6.
Ming-Yuan Cheng et al., A Polymer-Based Capacitive Sensing Array for Normal and Shear Force Measurement, Sensors, 2010, 10211-10225, 10(11).
Chase, Troy A. et al., A Thin-Film Flexible Capacitive Tactile Normal/Shear Force Array Sensor, IEEE, 1995, 1196-1201.
Ho Young Lee et al., Dielectric response of solids for contactless detection of stresses and strains, Sensors and Actuators A: Physical, 2007, 287-295, 137.
Chu, Z. et al., Silicon Three-axial Tactile Sensor, The 8th International Conference on Solid-State Sensors and Actuators and Eurosensors IX, Transducers '95, 1995, 656-659.
Roberts, P. et al., Soft-Matter Capacitive Sensor for Measuring Shear and Pressure Deformation, 2013 IEEE International Conference on Robotics and Automation (ICRA), 2013, 3529-3534.
Intellectual Property Office, Ministry of Economic Affairs, R. O. C, "Office Action", dated Jul. 21, 2016, Taiwan.

* cited by examiner

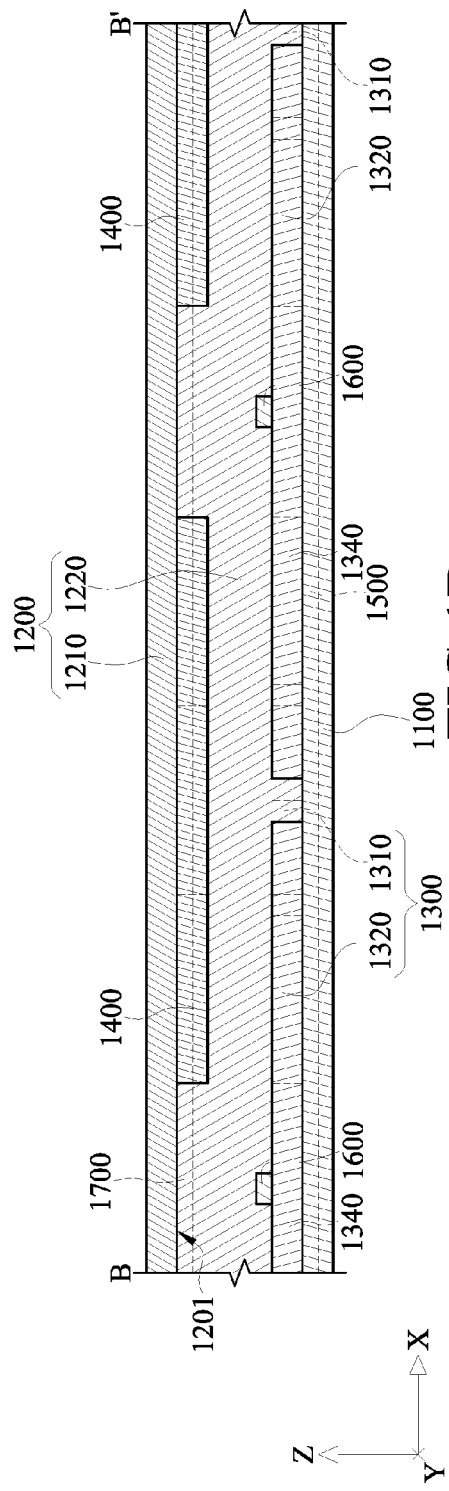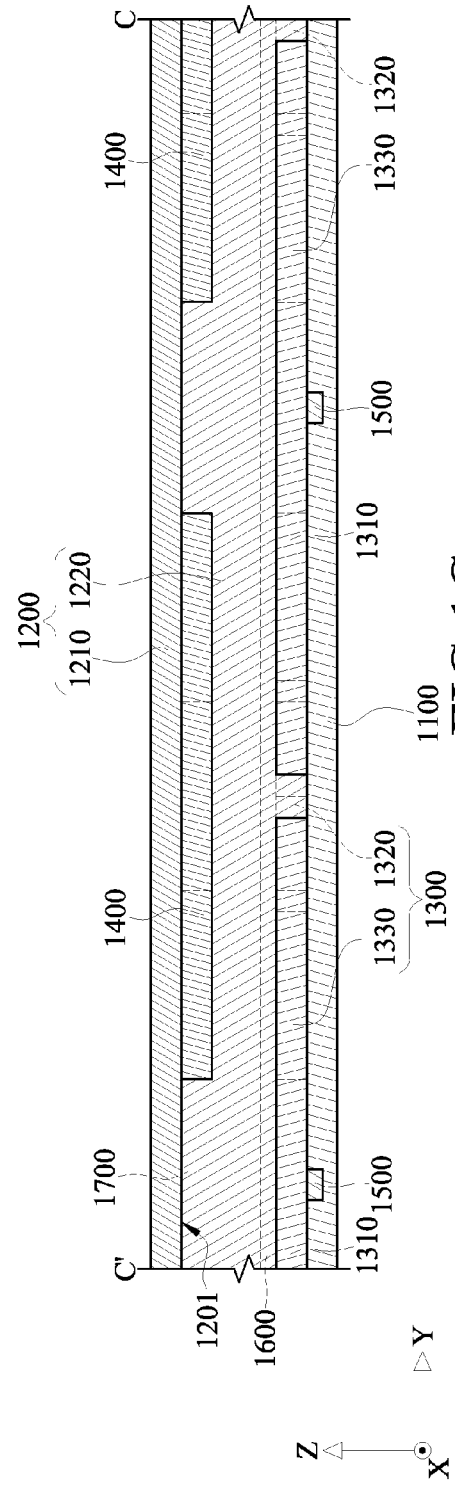

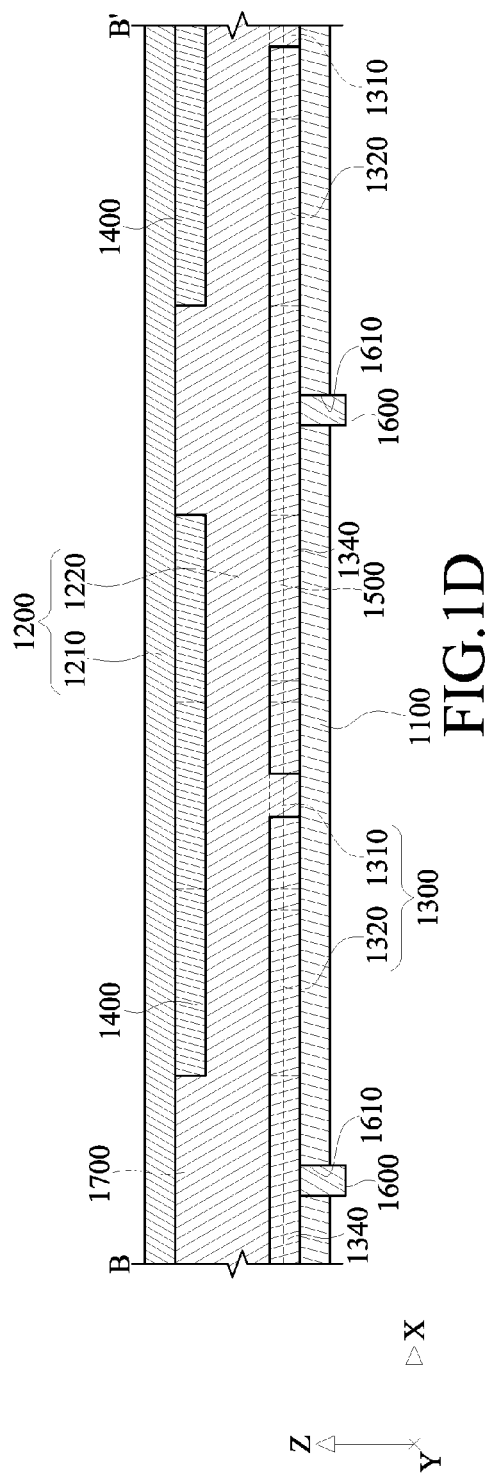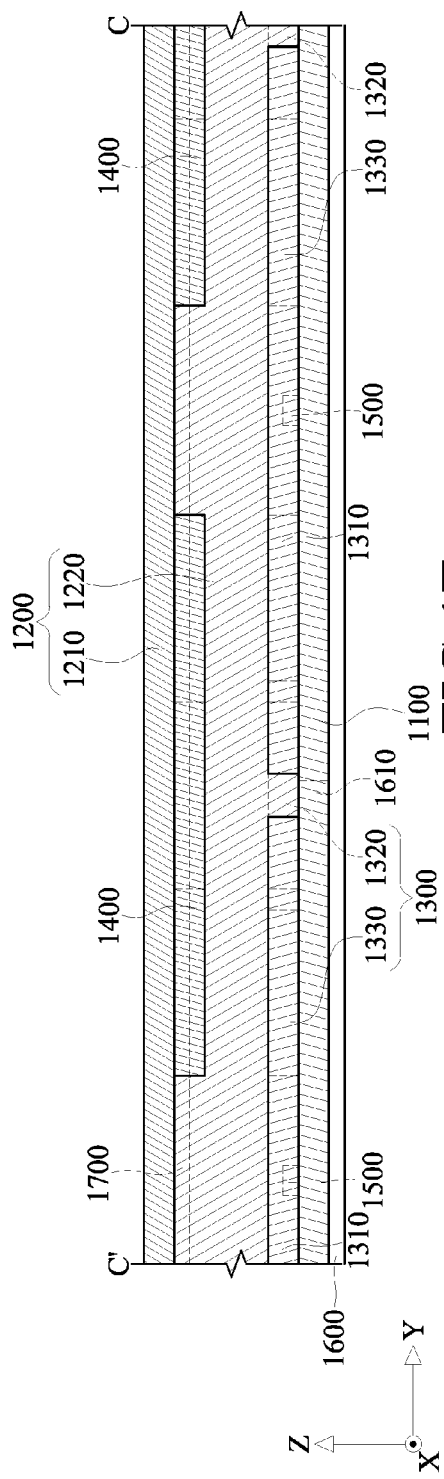

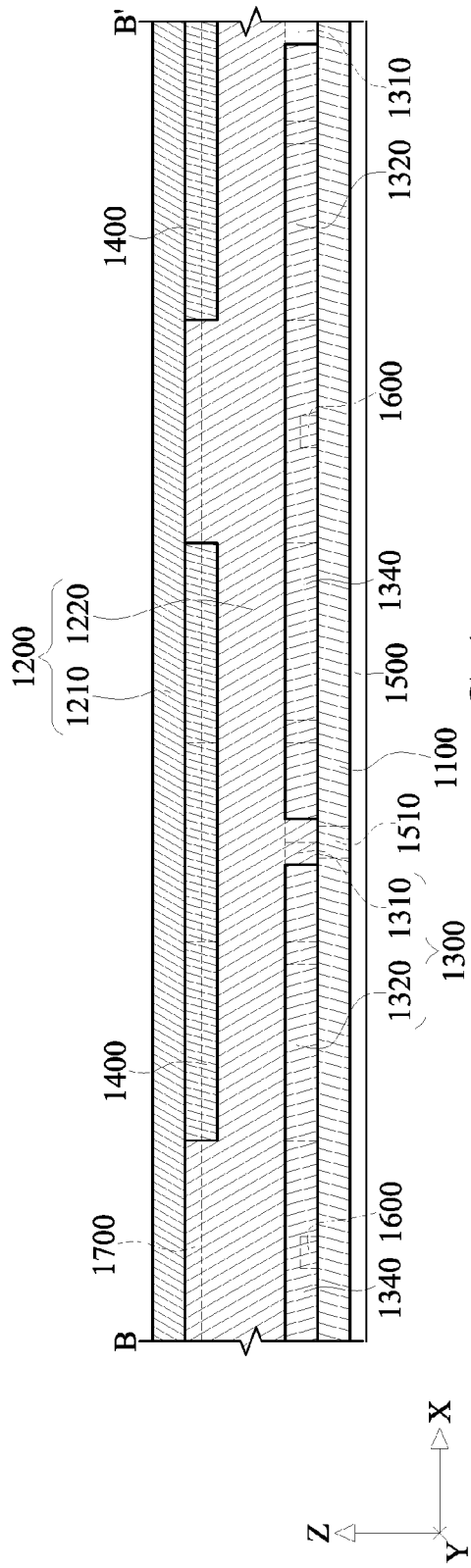
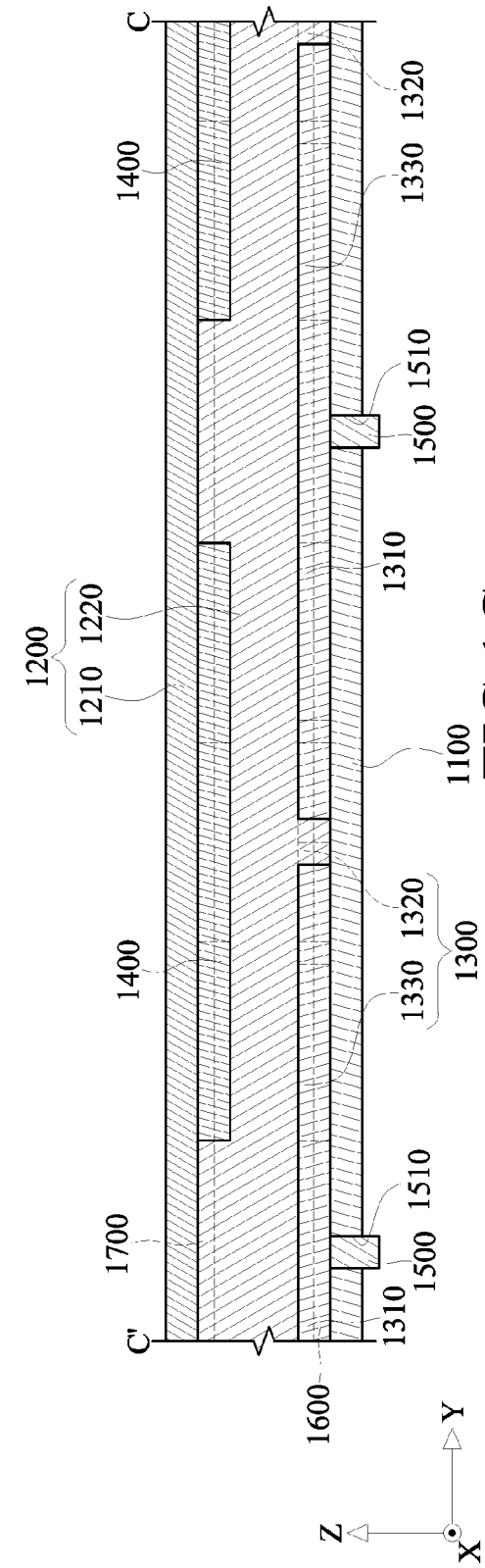

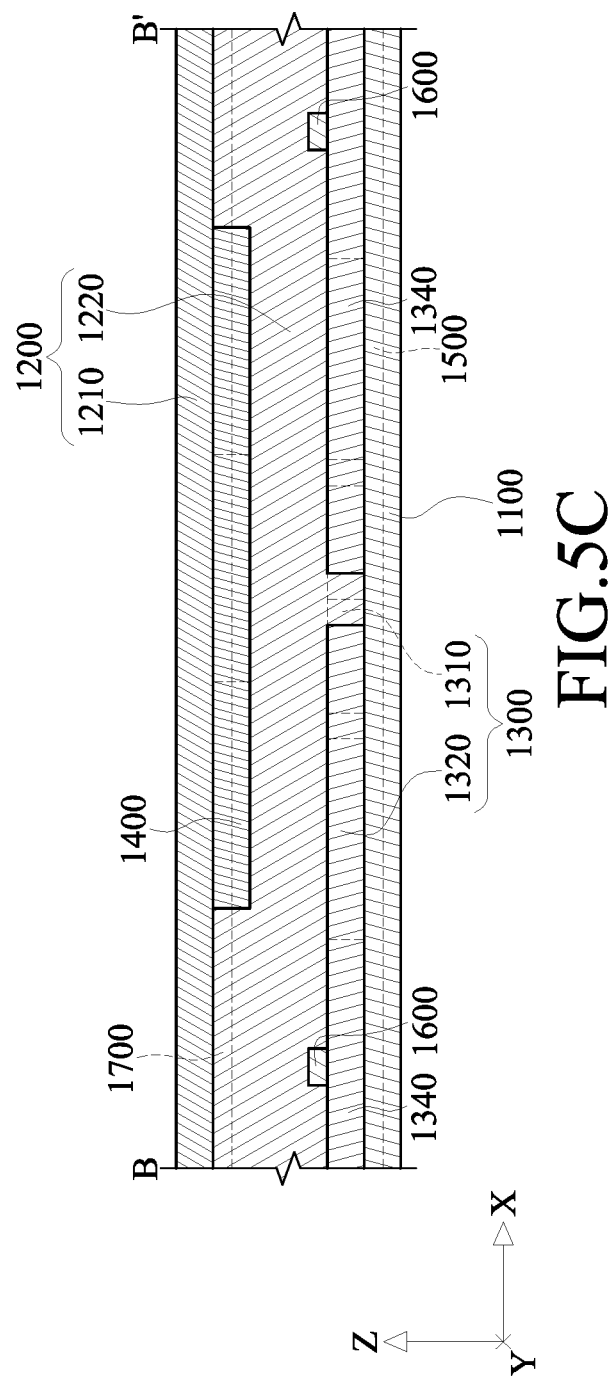

SENSING DEVICE

CROSS-REFERENCE TO RELATED APPLICATIONS

This non-provisional application claims priority under 35 U.S.C. §119(a) on Patent Application No. 104119142 filed in Taiwan, R.O.C on Jun. 12, 2015, the entire contents of which are hereby incorporated by reference.

BACKGROUND

Technical Field

The present disclosure relates to a sensing device, particularly to an array type multi-dimension sensing device.

Description of the Related Art

The pressure sensing device is for detecting the pressure taken in certain position and is widely applied to devices in every kind of environment. The current pressure sensing device is usually made of piezoelectric materials or micro electro mechanical system (MEMs). The material cost of the piezoelectric material is expensive and the MEMs is too delicate to be damaged. Therefore, the technique of capacitive pressure sensing is proposed to implement the pressure sensing device with low cost.

However, the current capacitive pressure sensing device has many problems. For example, the current array capacitive pressure sensing device can only detect pressure, that is, the amount of the force taken on the surface straightly. Researchers have proposed the multi-dimension capacitive sensing technique, but the current multi-dimension capacitive sensing technique has the problems of an oversized area and the incapability of array type layout, so that it is not available to be applied to medium and small size devices.

SUMMARY

A sensing device includes a first substrate, a second substrate, a plurality of second electrodes, a plurality of sets of first electrodes, a plurality of first axis signal lines, a plurality of second axis signal lines, and a plurality of second signal lines. The second substrate is above the first substrate and has at least one reset structure. The plurality of second electrodes are on a first surface of the second substrate in array. The plurality of sets of first electrodes are on the first substrate in array, and each of the plurality of sets of first electrodes corresponds to one of the plurality of second electrodes, and each of the plurality of sets of first electrodes further includes at least one first axis electrode and at least one second axis electrode. The at least one first axis electrode is partially overlapping the corresponding second electrode. The at least one second axis electrode is partially overlapping the corresponding second electrode. The plurality of first axis signal lines are connected to the plurality of first axis electrodes respectively. The plurality of second axis signal lines are connected to the plurality of second axis electrodes respectively. The plurality of second signal lines are connected to the plurality of second electrodes respectively.

The contents of the present disclosure set forth and the embodiments hereinafter are for demonstrating and illustrating the spirit and principles of the present disclosure, and for providing further explanation of the claims.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein:

FIG. 1B is a partial section view along the BB' section line in FIG. 1A;

FIG. 1C is a partial section view along the CC' section line in FIG. 1A;

FIG. 1D is a partial section view along the BB' section line in FIG. 1A according to another embodiment;

FIG. 1E is a partial section view along the CC' section line in FIG. 1A according to another embodiment;

Figure 1A:
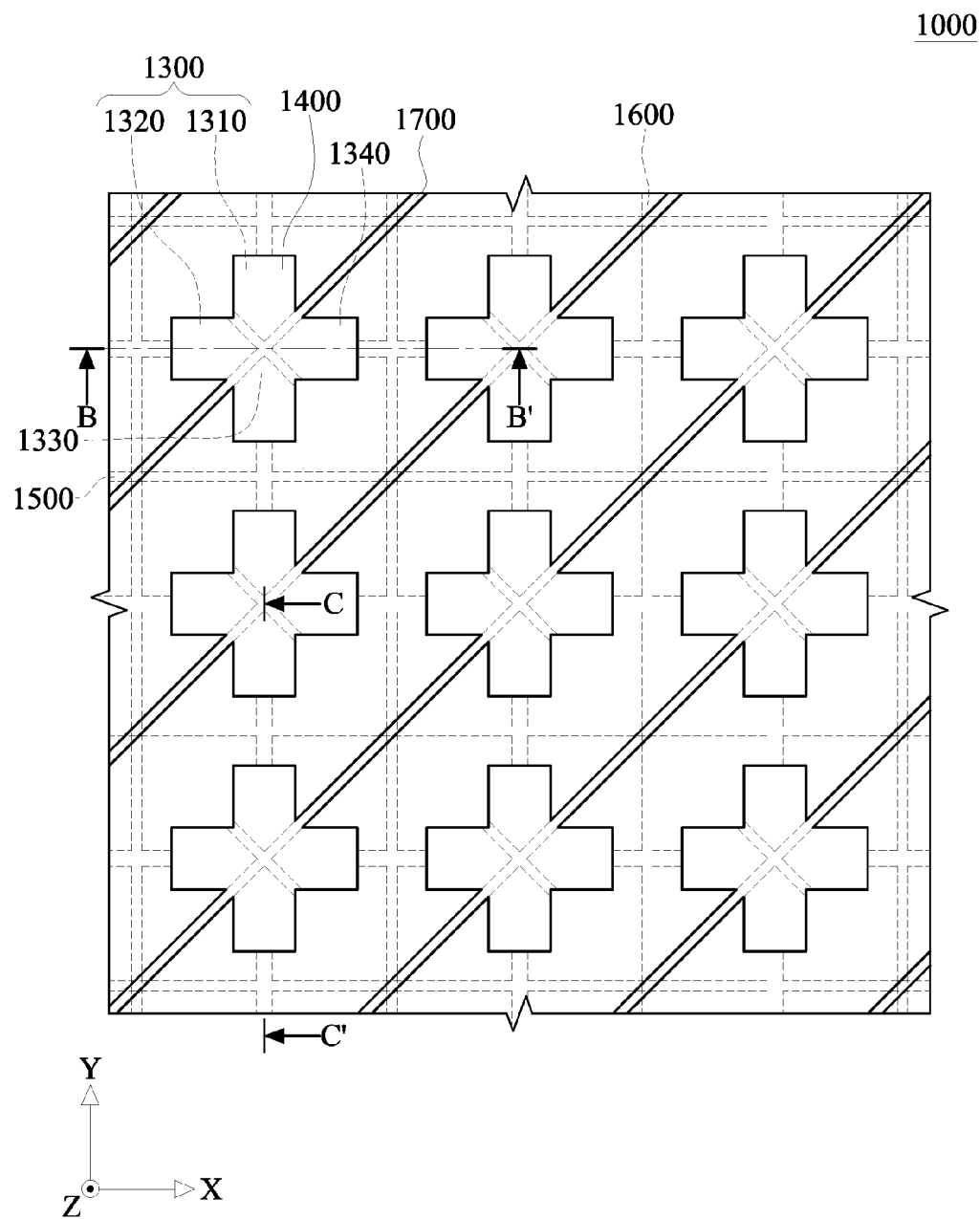
FIG. 1A is a top view of the sensing device according to an embodiment.
Figure 2A:
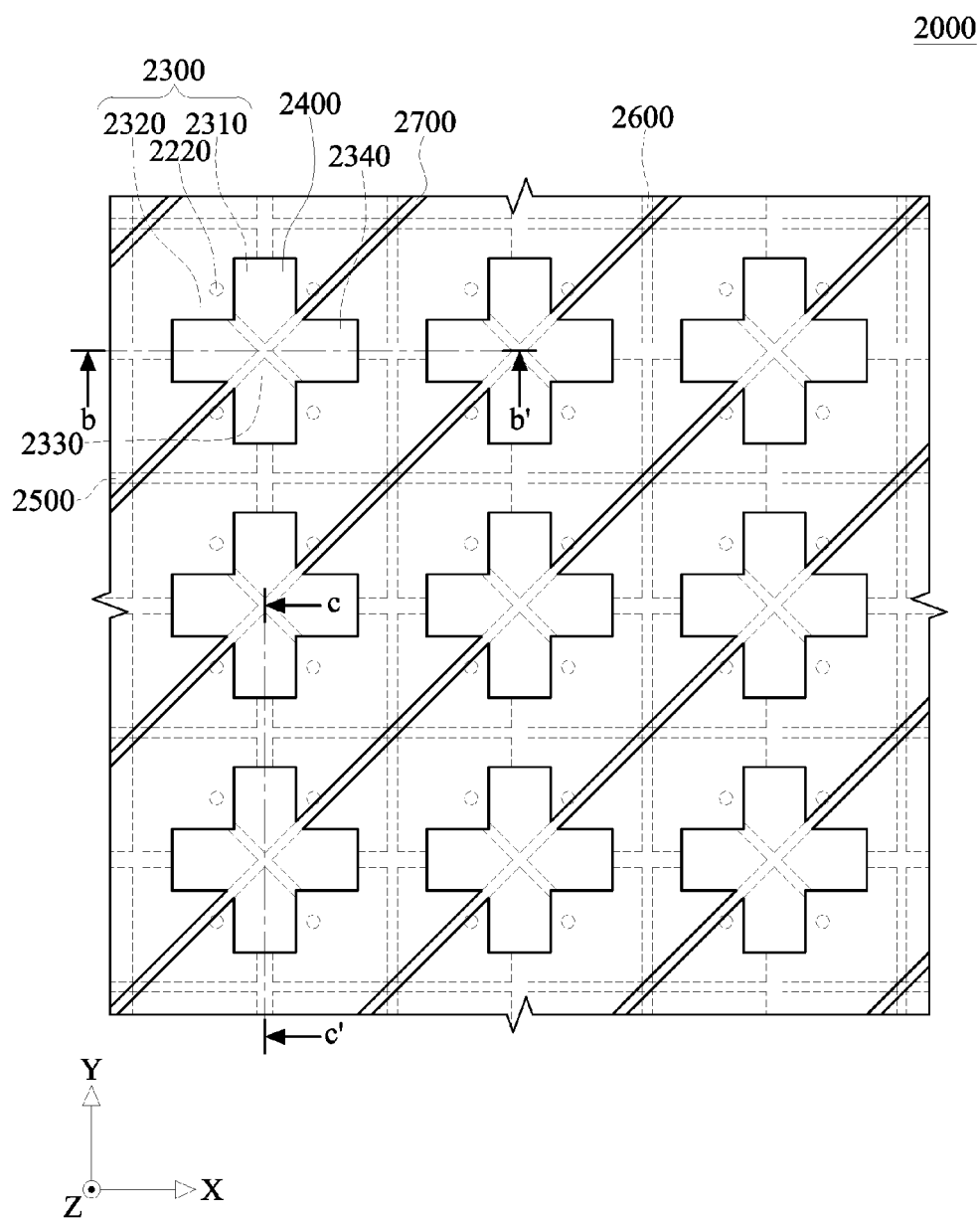
Figure 2B:
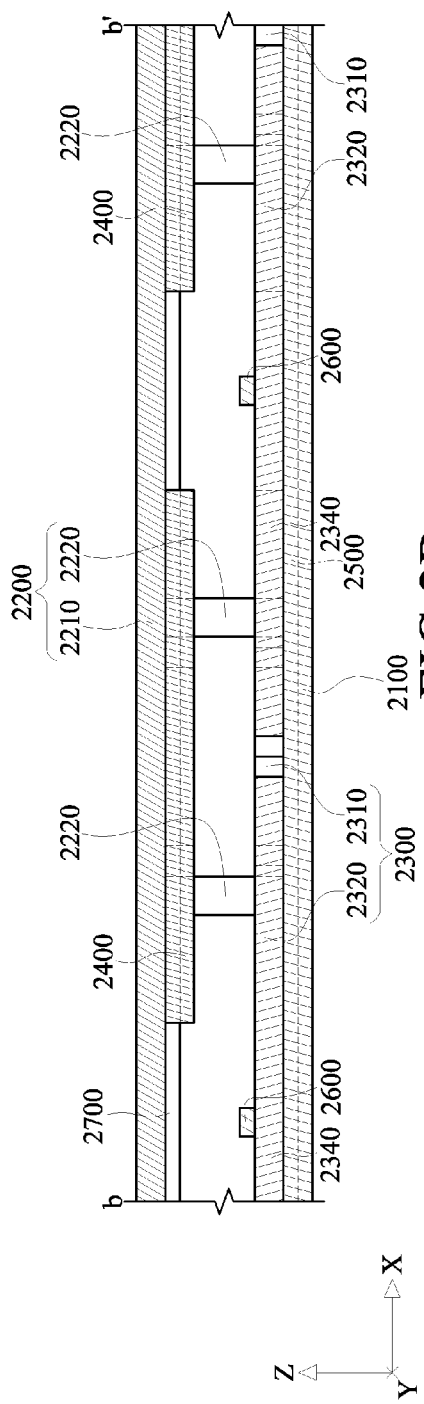
Figure 2C:
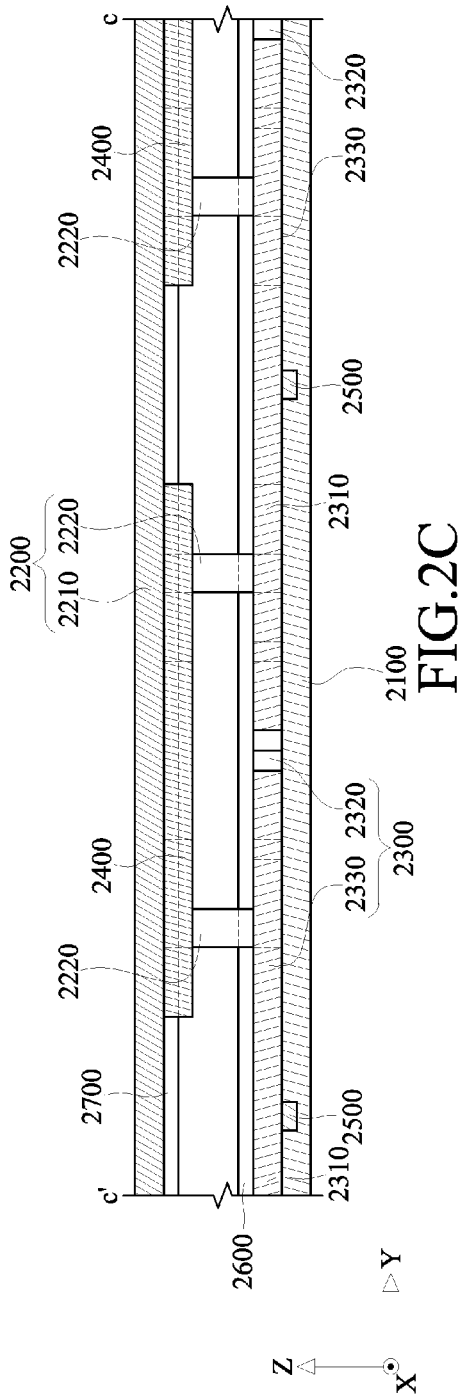
Figure 2D:
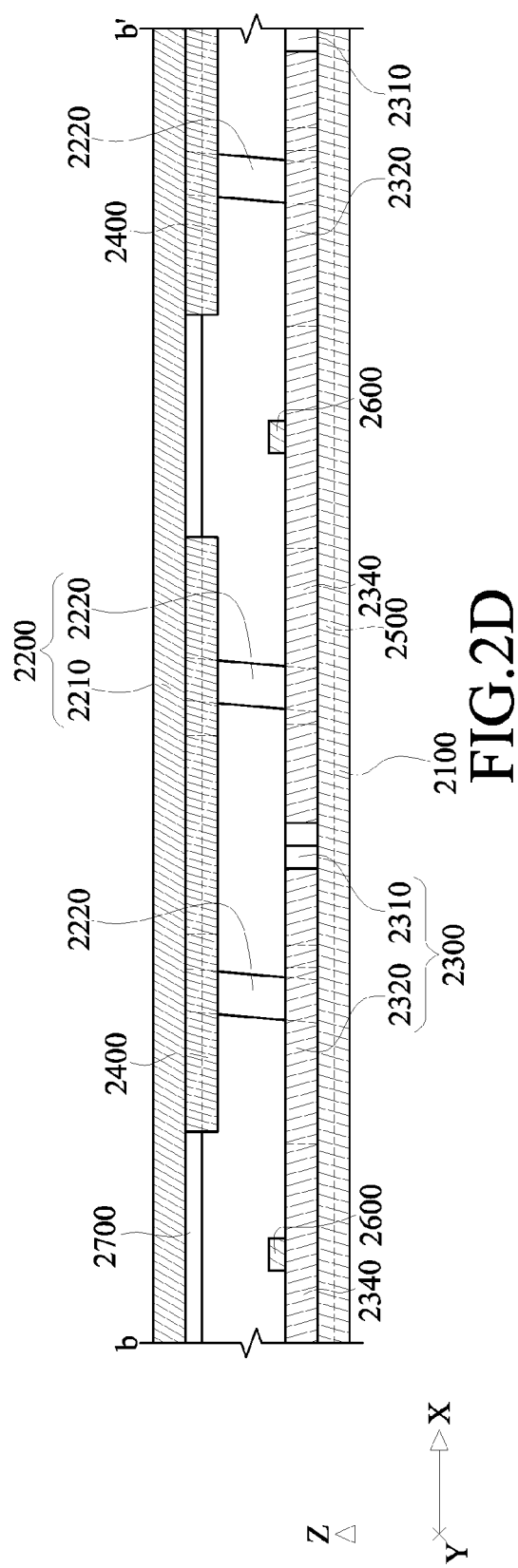
Figure 3A:
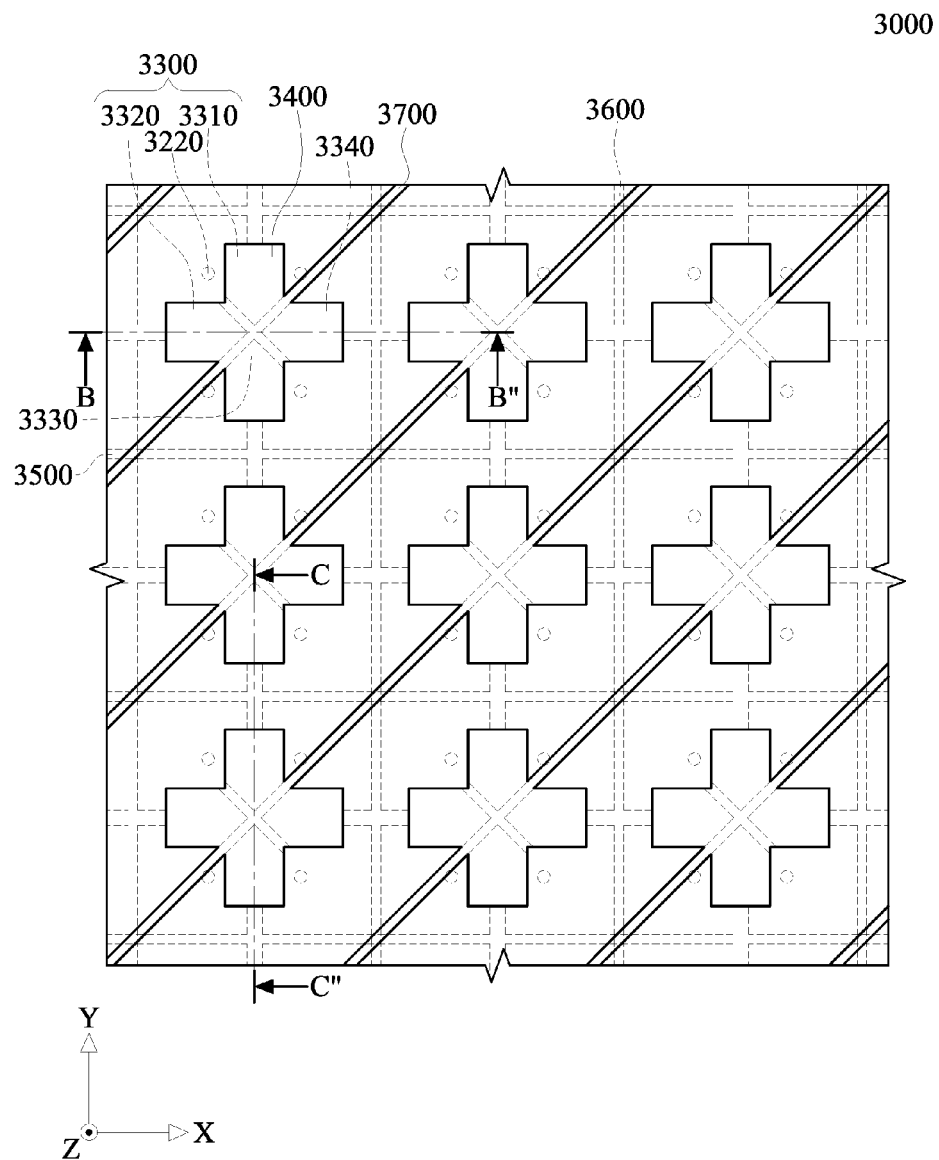
Figure 3B:
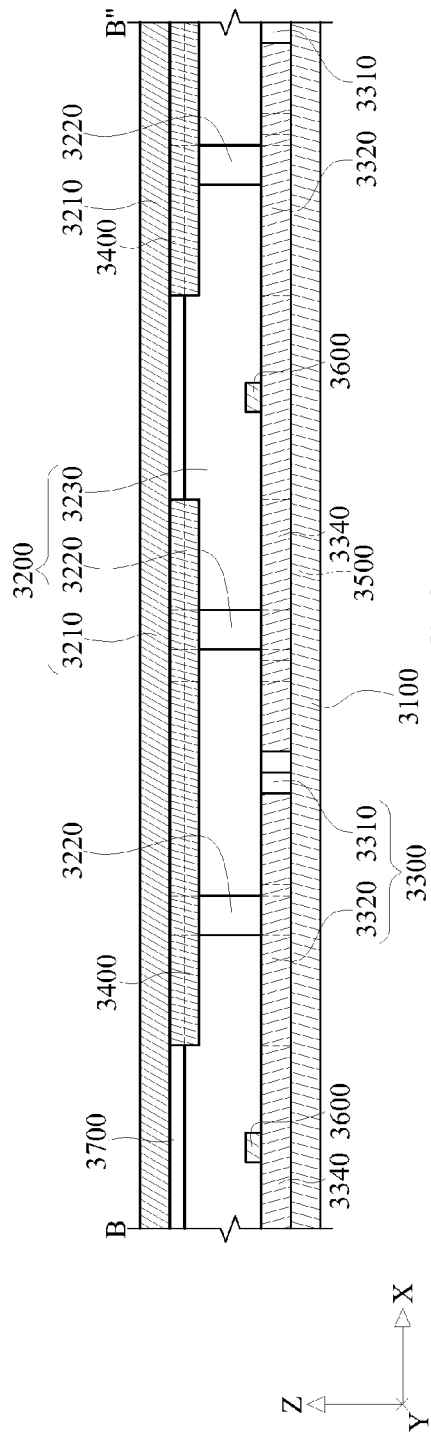
Figure 3C:
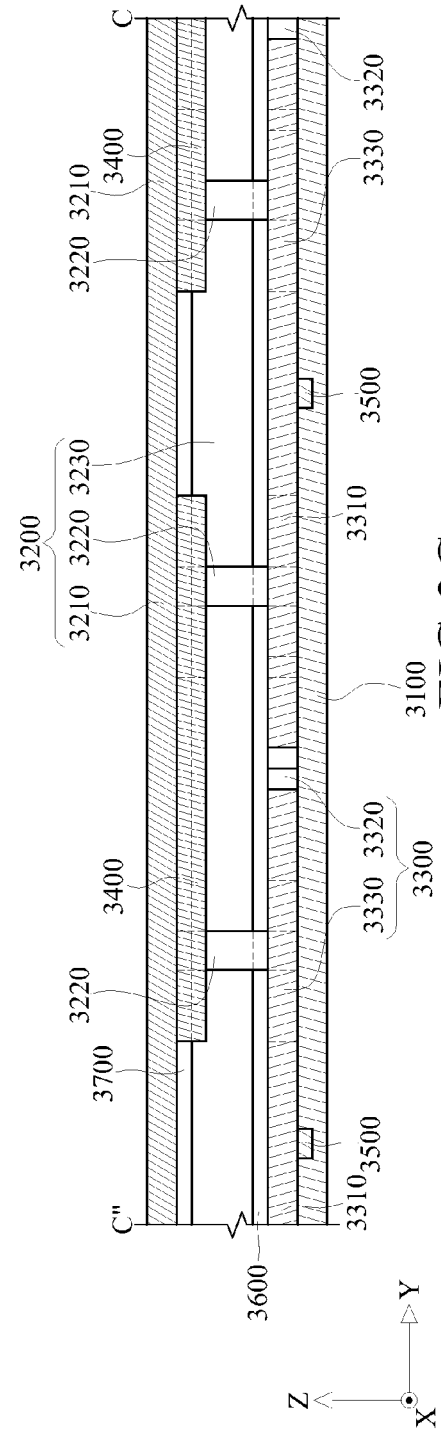
Figure 4:
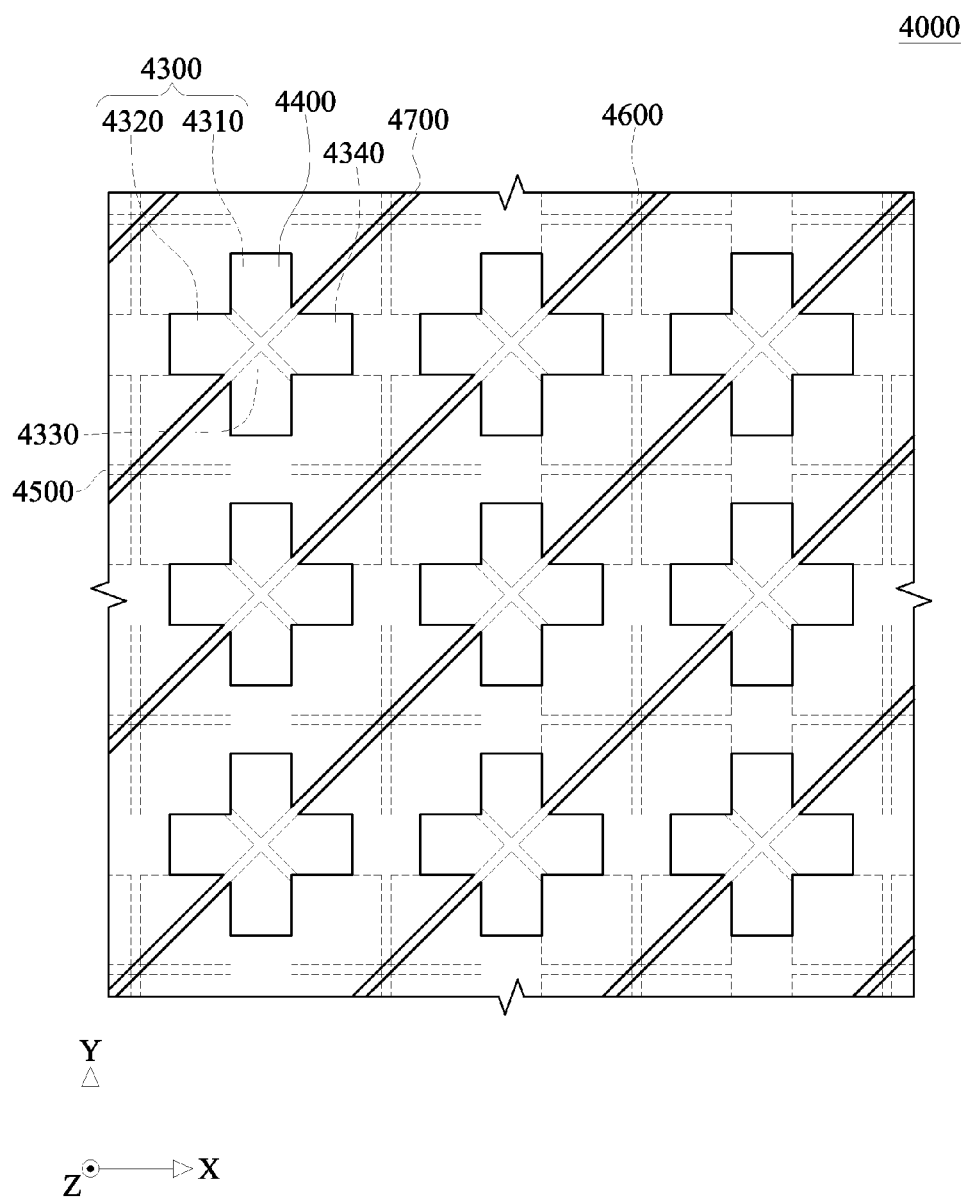
Figure 5A:
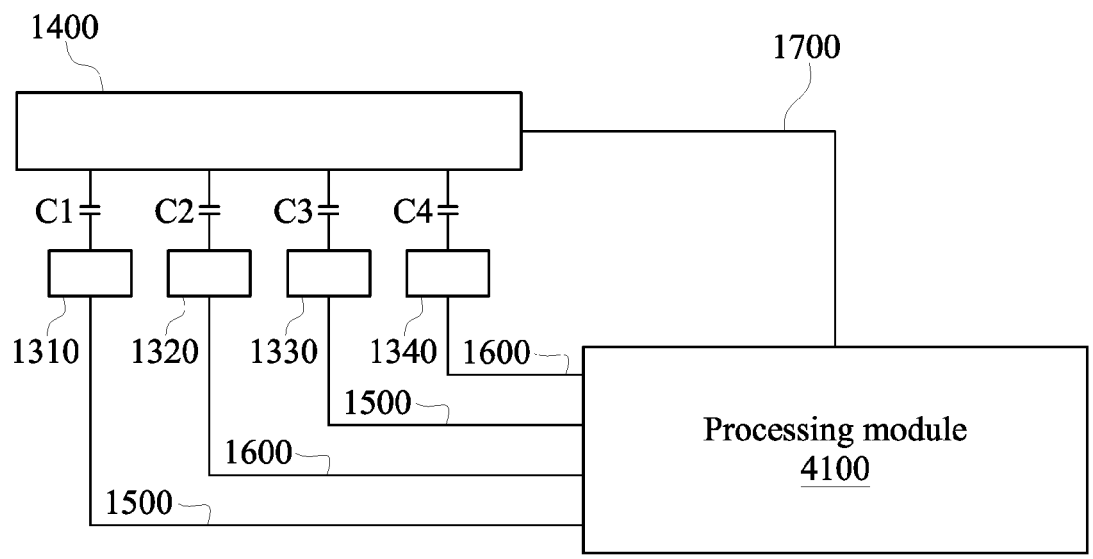
Figure 5B:
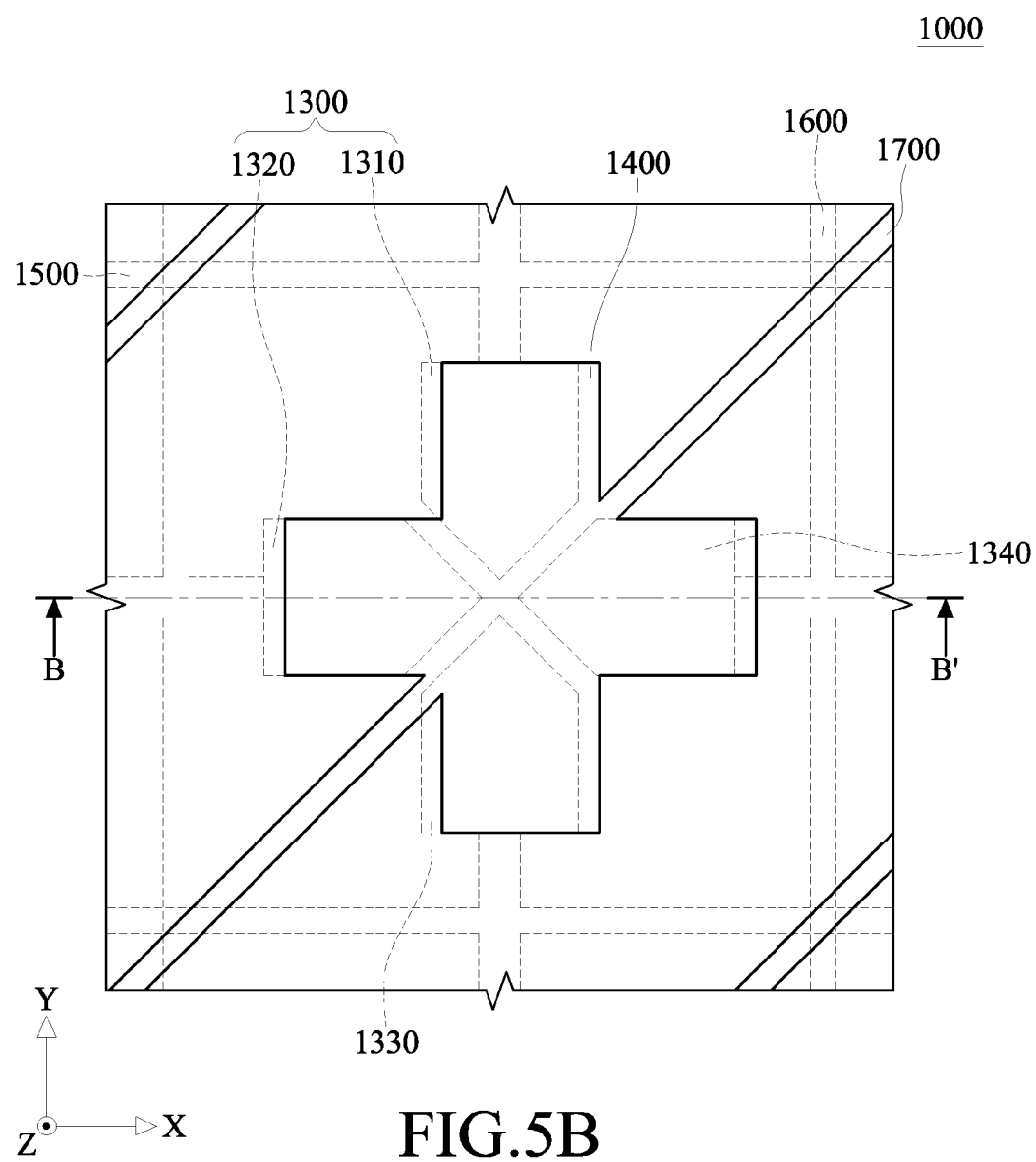
Figure 5D:
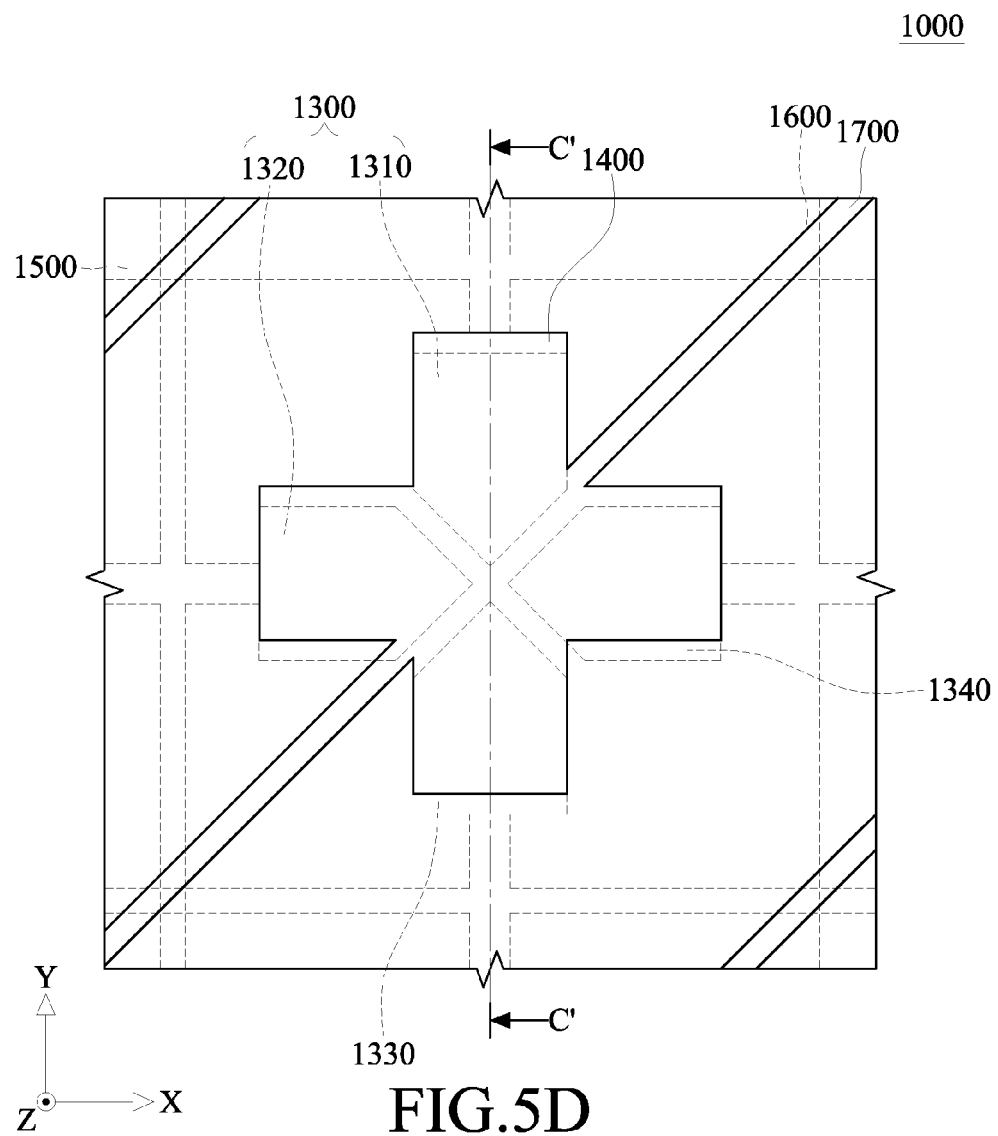
Figure 5E:
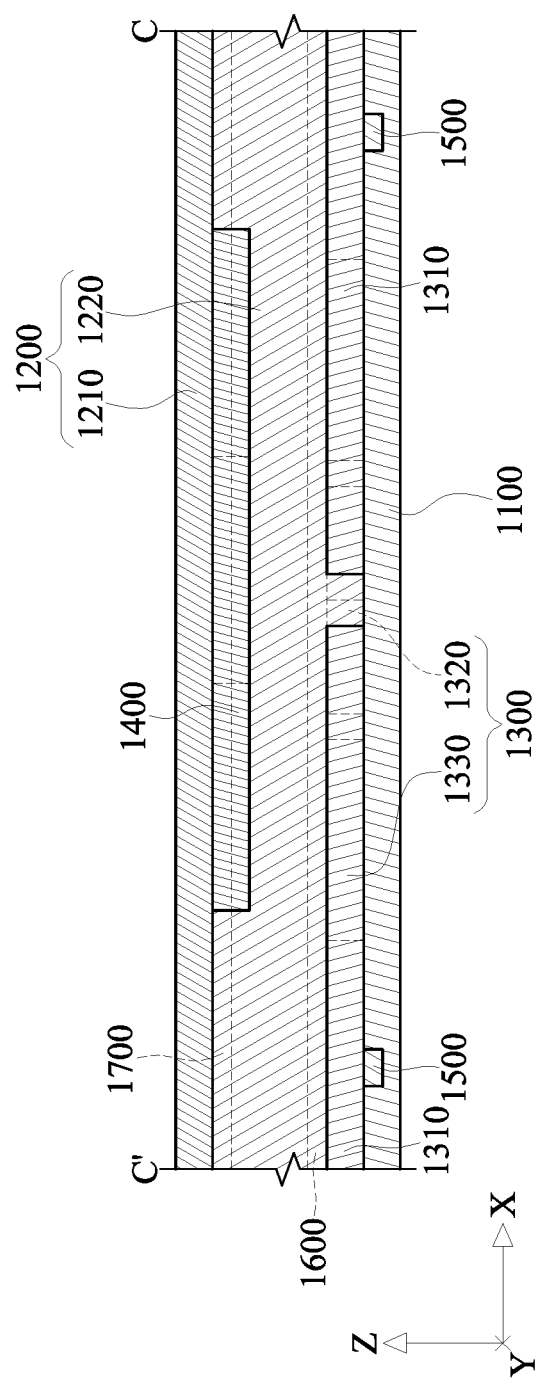

FIG. IF is a partial section view along the BB' section line in FIG. 1A according to another embodiment;

FIG. 1G is a partial section view along the CC' section line in FIG. 1A according to another embodiment;

FIG. 2A is a top view of the sensing device according to an embodiment;

FIG. 2B is a partial section view along the bb' section line in FIG. 2A;

FIG. 2C is a partial section view along the cc' section line in FIG. 2A;

FIG. 2D is a partial section view along the cc' section line in FIG. 2A when the second substrate of the sensing device shifts along the X axis;

FIG. 3A is a top view of the sensing device according to an embodiment;

FIG. 3B is a partial section view along the BB' section line in FIG. 3A;

FIG. 3C is a partial section view along the CC' section line in FIG. 3A;

FIG. 4 is a top view of the sensing device according to another embodiment;

FIG. 5A is a diagram of the sensing device circuit corresponding to FIG. 1A;

FIG. 5B is a diagram of the second substrate shifting along the X axis when taking stress according to an embodiment;

FIG. 5C is a partial section view along the BB' section line in FIG. 5B;

FIG. 5D is a diagram of the second substrate shifting along the Y axis when taking stress according to an embodiment; and FIG. 5E is a partial section view along the CC' section line in FIG. 5D.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Please refer to FIG. 1A to FIG. 1C. FIG. 1A is a top view of the sensing device according to an embodiment. FIG. 1B is a partial section view along the BB' section line in FIG. 1A. FIG. 1C is a partial section view along the CC' section line in FIG. 1A. As shown in the figures, according to an embodiment of the present disclosure, the sensing device 1000 has a first substrate 1100, a second substrate 1200, a plurality of sets of first electrode 1300, a plurality of second electrodes 1400, a plurality of first axis signal lines 1500, a plurality of second axis signal lines 1600, and a plurality of second signal lines 1700. As can be seen in FIG. 1A, the plurality of first axis signal line 1500 are not parallel to the plurality of second axis signal lines 1600. Further can be seen in FIG. 1A, the plurality of second signal lines 1700 are not parallel to neither the plurality of first axis signal lines 1500 nor the plurality of second axis signal lines 1600. The second substrate 1200 is above the first substrate 1100, and the second substrate 1200 has a reset structure. In the present embodiment, the reset structure is a soft dielectric 1220 between a body 1210 of the second substrate 1200 and the first substrate 1100. The plurality of second electrodes 1400 are on a first surface 1201 of the second substrate 1200 in array, and the first surface 1201 is, for example, the lower surface. The plurality of sets of first electrodes 1300 are on the first substrate 1100 in array. Each of the plurality of sets of first electrodes 1300 corresponds to one of the plurality of second electrodes 1400, and each of the plurality of sets of first electrodes 1300 has the first axis electrodes 1310, 1330 and the second axis electrodes 1320, 1340.

The first axis electrodes 1310, 1330 and the second axis electrodes 1320, 1340 are partially overlapped by the corresponding second electrode 1400. Part of the lateral of the first axis electrodes 1310, 1330 all or partially overlap the lateral of the second electrode 1400, and part of the lateral of the second axis electrodes 1320, 1340 all or partially overlap the lateral of the second electrode 1400. The plurality of first axis signal lines 1500 are connected to the first axis electrodes 1310, 1330 respectively. The plurality of second axis signal lines 1600 are connected to the second axis electrodes 1320, 1340 respectively. The plurality of second signal lines 1700 are connected to the second electrode 1400 respectively. In some embodiments, the plurality of second signal lines 1700 and the second electrode 1400 are made in the same process at one time, so that the plurality of second signal lines 1700 and the second electrode 1400 are uniformly integrated graphical electrode and signal lines. In some other embodiments, the plurality of second signal lines 1700 and the second electrode 1400 are not made in the same process, so that the plurality of second signal lines 1700 and the second electrode 1400 are not uniformly integrated and the materials can be the same or different, such as transparent conductive material, metal, or other suitable materials. In some embodiments, the first axis electrode 1310 is connected to the first axis electrode 1330 in part of the first electrode 1300, and the second axis electrode 1320 is connected to the second axis electrode 1340 in the other part of the first electrode 1300. In other words, in some embodiments, part of the first electrode 1300 only has a first axis electrode and two second axis electrodes, and the other part of the first electrode 1300 has two first axis electrodes and a second axis electrode.

In another embodiment, please refer to FIG. 1A, FIG. 1D, and FIG. 1E. FIG. 1D is a partial section view along the BB' section line in FIG. 1A according to another embodiment. FIG. 1E is a partial section view along the CC' section line in FIG. 1A according to another embodiment. The difference between the embodiment in FIG. 1D and FIG. 1E and the embodiment in FIG. 1B and FIG. 1C is that the second axis signal line 1600 is on the lower surface of the first substrate 1100 and is connected to the second axis electrode 1320 and the second axis electrode 1340 through the perforation 1610.

In yet another embodiment, please refer to FIG. 1A, FIG. 1F, and FIG. 1G. FIG. 1F is a partial section view along the BB' section line in FIG. 1A according to another embodiment. FIG. 1G is a partial section view along the CC' section line in FIG. 1A according to another embodiment. The difference between the embodiment in FIG. 1F and FIG. 1G and the embodiment in FIG. 1B and FIG. 1C is that the first axis signal line 1500 is on the lower surface of the first substrate 1100 and is connected to the first axis electrode 1310 and the first axis electrode 1330 through the perforation 1510.

In another embodiment, please refer to FIG. 2A to FIG. 2C. FIG. 2A is a top view of the sensing device according to an embodiment. FIG. 2B is a partial section view along the bb' section line in FIG. 2A. FIG. 2C is a partial section view along the cc' section line in FIG. 2A. As shown in the figures, the sensing device 2000 in another embodiment of the present disclosure has a first substrate 2100, a second substrate 2200, a plurality of sets of first electrodes 2300 including first axis electrodes 2310, 2330 and second axis electrodes 2320, 2340, a plurality of second electrodes 2400, a plurality of first axis signal lines 2500, a plurality of second axis signal lines 2600, and a plurality of second signal lines 2700. The second substrate 2200 is above the first substrate 2100 and the second substrate 2200 has a reset structure. In the present embodiment, the difference between the embodiments in FIG. 1A to FIG. 1C is that the reset structure is a plurality of elastic units 2220 connected to the body 2210 of the second substrate 2200 and the first substrate 2100. Each of the plurality of second electrodes 2400 is surrounded by the plurality of elastic units 2220. The plurality of elastic units 2220 are components with self-reset capability, such as rubber columns or springs. In an embodiment, the two ends of the plurality of elastic units 2220 are fixed to the body 2210 of the second substrate 2220 and to the object on the surface of the first substrate 2100. In addition, in association with the layout of the plurality of first axis signal lines 2500 and the plurality of second axis signal lines 2600, please refer to the variations of FIG. 1A to FIG. 1G. The plurality of first axis signal lines 2500 are electrically isolated to the plurality of second axis signal lines 2600.

Please refer to FIG. 2D. FIG. 2D is a partial section view along the cc' section line in FIG. 2A when the second substrate of the sensing device shifts along the X axis. As shown in FIG. 2D, when the body 2210 of the second substrate shifts along the positive direction of the X axis and the two ends of the elastic unit 2220 is fixed to the body 2210 of the second substrate and to the first substrate 2100, the elastic volume is directly proportional to the stress applying on the body 2210 of the second substrate. In an embodiment, the body 2210 is made by soft materials or flexible materials, so that different pressure deformations exist in different areas.

In a further embodiment, please refer to FIG. 3A to FIG. 3C. FIG. 3A is a top view of the sensing device according to an embodiment. FIG. 3B is a partial section view along the BB' section line in FIG. 3A. FIG. 3C is a partial section view along the CC' section line in FIG. 3A. As shown in the figures, the sensing device 3000 in a further embodiment of the present disclosure has a first substrate 3100, a second substrate 3200, a plurality of sets of first electrodes 3300 including first axis electrodes 3310, 3330 and second axis electrodes 3320, 3340, a plurality of second electrodes 3400, a plurality of first axis signal lines 3500, a plurality of second axis signal lines 3600, and a plurality of second signal lines 3700. The second substrate 3200 is above the first substrate 3100 and the second substrate 3200 has a pressing part 3210, a fixed structure 3220, and a reset structure 3230. The material of the pressing part 3210 is a rigid material or flexible material, and the material of the reset structure 3230 has to be a flexible or elastic material. The reset structure 3230 surrounds each pressing part 3210 and the location of the second electrode 3400 corresponds to the pressing part 3210. In the present embodiment, the difference between the embodiments of FIG. 1A to FIG. 1C is that the fixed structure in the present embodiment is the plurality of inclinable rigid components connected to the reset structure 3230 of the second substrate 3200 and to the first substrate 3100. There are a plurality of inclinable rigid components around each of the plurality of second electrodes 3400. The plurality of rigid components are, for example, rubber columns. In an embodiment, the two ends of the rigid component are fixed to the reset structure 3210 of the second substrate 3200 and to the object on the surface of the first substrate 3100. When the second substrate 3200 shifts horizontally relative to the first substrate 3100, the reset structure 3230 tilts correspondingly, wherein the horizontal direction is, for example, the plane formed by the X and Y axes shown in the figure. In addition, in association with the layout of the plurality of first axis signal lines 3500 and the plurality of second axis signal lines 3600, please refer to the variations of FIG. 1A to FIG. 1G. The plurality of first axis signal lines 3500 are electrically isolated to the plurality of second axis signal lines 3600.

In another embodiment, please refer to FIG. 4. FIG. 4 is a top view of the sensing device according to another embodiment. As shown in FIG. 4, comparing to the embodiment in FIG. 1A, the second electrode 4400 in the present embodiment partially overlaps the first axis electrodes 4310, 4330 and the second axis electrodes 4320, 4340.

Relatively, the four protrusion parts of the second electrode 4400 in the present embodiment overlap part of the first axis electrode or part of the second axis electrode. In an embodiment, the second electrode is not necessarily the cross shape shown in the figure. The second electrode is, but not limited to, a rectangle, a rhombus, a circle, or other symmetric shape.

In order to explain the actuation of the sensing device, please refer to FIG. 1A to FIG. 1C and FIG. 5A to FIG. 5E. FIG. 5A is a diagram of the sensing device circuit corresponding to FIG. 1A. FIG. 5B is a diagram of the second substrate shifting along the X axis when taking stress according to an embodiment. FIG. 5C is a partial section view along the BB' section line in FIG. 5B. FIG. 5D is a diagram of the second substrate shifting along the Y axis when taking stress according to an embodiment. FIG. 5E is a partial section view along the CC' section line in FIG. 5D. As shown in FIG. 5A, the sensing device further includes a processing module 4100 comparing to the sensing device 1000 in FIG. 1A. An equivalent capacitor C1 exists between the first axis electrode 1310 and the second electrode 1400, and an equivalent capacitor C2 exists between the first axis electrode 1330 and the second electrode 1400, and an equivalent capacitor C3 exists between the second axis electrode 1320 and the second electrode 1400, and an equivalent capacitor C4 exists between the second axis electrode 1340 and the second electrode 1400. Taking the capacitor C1 for example, the capacitance value of the capacitor is described as the following equation (1):

$$C1 = \varepsilon \frac{A_{ov1}}{d_1} + C_{f1} \quad (1)$$

In the equation (1), the constant $\varepsilon$ represents a dielectric constant of the soft dielectric 1220, and $A_{ov1}$ is the overlapping area of the first axis electrode 1310 and the second electrode 1400, and $d_1$ is the distance between the first axis electrode 1310 and the second electrode 1400, and $C_{f1}$ is the fringing field effect capacitance. Therefore, the processing module 4100 estimates the variation of the overlapping area and the variation of the distance between the first axis electrode 1310 and the second electrode 1400 by referencing the variation of C1. Accordingly, the stress or pressure in the horizontal direction and the stress in the vertical direction are obtained by calculation or table lookup, wherein the horizontal direction is the XY plane and the vertical direction is the Z axis.

As shown in FIG. 5B and FIG. 5C, when the second substrate 1200 shifts along the positive direction of the X axis, the overlapping area between the first axis electrode 1310 and the second electrode 1400, the overlapping area between the first axis electrode 1330 and the second electrode 1400, and the overlapping area between the second axis electrode 1320 and the second electrode 1400 are decreased. In addition, the overlapping area between the second axis electrode 1340 and the second electrode 1400 is almost unchanged. Therefore, in practice, the capacitance values of the capacitor C1, the capacitor C3, and the capacitor C2 are decreased slightly, and the capacitance value of the capacitor C4 is almost unchanged or even increased slightly. Accordingly, the processing module 4100 determines that the second substrate 1200 shifts along the positive direction of the X axis in the area of the second electrode 1400. Furthermore, the processing module 4100 estimates the variations of the overlapping areas of the first axis electrodes and the second axis electrodes relative to the second electrode to calculate the shifted distance.

As shown in FIG. 5D and FIG. 5E, when the second substrate 1200 shifts along the positive direction of the Y axis, the overlapping area between the first axis electrode 1320 and the second electrode 1400, the overlapping area between the first axis electrode 1340 and the second electrode 1400, and the overlapping area between the second axis electrode 1330 and the second electrode 1400 are decreased. In addition, the overlapping area between the second axis electrode 1310 and the second electrode 1400 is unchanged. Therefore, in practice, the capacitance values of the capacitor C2, the capacitor C3, and the capacitor C4 are decreased slightly, and the capacitance value of the capacitor C1 is almost unchanged or even increased slightly. Accordingly, the processing module 4100 determines that the second substrate 1200 shifts along the positive direction of the Y axis in the area of the second electrode 1400. Furthermore, the processing module 4100 estimates the variations of the overlapping areas of the first axis electrodes and the second axis electrodes relative to the second electrode to calculate the shifted distance. Practically, the capacitance values of the capacitors C1 to C4 are implemented by the capacitance sensing method of the current projective capacitive touch techniques using the second signal line 1700 as the transmission port and using the first axis signal line 1500 and the second axis signal line 1600 as the receiving port. The implementation is not further explained hereinafter.

Similarly, referring to the equation (1), when the second substrate 1200 takes force in the Z axis, the distance between the electrodes in each axis of the second electrode 1400 and the first electrode 1300 is decreased. Therefore, the processing module 4100 calculates the shifted distance of the second substrate 1200 in Z axis according to the capacitance value increment of the capacitor C1 to C4.

In addition, please refer to FIG. 4, FIG. 5B, and FIG. 5C. As shown in FIG. 5B, when the second substrate 1200 shifts along the positive direction of the X axis, the overlapping areas between the first axis electrode 1310, first axis electrode 1330, second axis electrode 1320 and the second electrode 1400 are decreased. In addition, the overlapping area between the second axis electrode 1340 and the second electrode 1400 is increased. Therefore, the capacitance values of the capacitor C1, C3, and C2 are slightly decreased and the capacitance value of the capacitor C4 is slightly increased. The processing module 4100 determines that the second substrate 1200 shifts towards the positive direction of the X axis in the area of the second electrode 1400. Furthermore, the processing module 4100 estimates the variations of the overlapping areas of the first axis electrodes and the second axis electrodes relative to the second electrode to calculate the shifted distance.

As shown in FIG. 5C, when the second substrate 1200 shifts along the positive direction of the Y axis, the overlapping areas between the second axis electrode 1320, the second axis electrode 1340, the first axis electrode 1330 and the second electrode 1400 are decreased. In addition, the overlapping area between the first axis electrode 1310 and the second electrode 1400 is increased. Therefore, the capacitance values of the capacitor C2, C3, and C4 are slightly decreased and the capacitance value of the capacitor C1 is slightly increased. The processing module 4100 determines that the second substrate 1200 shifts along the positive direction of the Y axis in the area of the second electrode 1400. Furthermore, the processing module 4100 estimates the variations of the overlapping areas of the first axis electrodes and the second axis electrodes relative to the second electrode to calculate the shifted distance.

Similarly, referring to the equation (1), when the second substrate 1200 takes force in Z axis, the distance between the electrodes in each axis of the second electrode 1400 and the first electrode 1300 is decreased. Therefore, the processing module 4100 calculates the shifted distance of the second substrate 1200 in Z axis according to the capacitance value increment of the capacitor C1 to C4.

According to the aforementioned explanation, the processing module 4100 calculates the shifted distances of the plurality of sensing electrodes in array relative to the locations according to the variation of the plurality of capacitance values of the first electrode 1300 and the second electrode 1400. Moreover, when the Young's modulus of the soft dielectric 1220 is saved in the processing module 4100 or in the system connected to the processing module 4100 in advance, the processing module 4100 further calculates the amount of the stress and direction taken by each of the plurality of sets of sensing electrodes. The shift and the stress is calculated by the formula or by the list saved in the processing module 4100 for table lookup.

In addition, the top and bottom positions of the first substrate and the second substrate and the top and bottom positions of the first electrode and the second electrode are exchangeable. The second electrode can also have one or a plurality of first axis electrodes and one or a plurality of second axis electrodes like the first electrode. Therefore, the processing module calculates the relative shift of each pair of the sensing electrodes more precisely according to the capacitor variation of each first axis electrode and each second axis electrode in the first electrode relative to each first axis electrode and each second axis electrode in the second electrode.

In the sensing device of the present disclosure, each electrode has individual signal line to connect to the processing module embedded in the sensing device or to the processing module outside the sensing device. The sensing device of the present disclosure does not need a floated electrode as part of the capacitor for sensing, wherein the floated electrode stands for the electrode which is not connected to the processing module or a certain reference voltage. Therefore, the sensing device has an array type layout and senses and estimates the relative shift of each pair of electrodes.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A sensing device, comprising:
   a first substrate;
   a second substrate above the first substrate, having at least one reset structure between the first substrate and a body of the second substrate;
   M*N second electrodes on a first surface of the second substrate in array, M and N being integers greater than two;
   M*N sets of first electrodes on the first substrate in array, wherein a (i, j)th set of first electrodes corresponds to a (i, j)th second electrode of second electrodes, i is an integer greater than zero and less than M, j is an integer greater than zero and less than N, and the (i, j)th set of first electrodes further comprises:
   a first one of first axis electrodes and a second one of first axis electrodes partially overlapping the corresponding second electrode; and
   a first one of second axis electrodes and a second one of second axis electrodes partially overlapping the corresponding second electrode;
   (M+1) first axis signal lines, with said first axis signal lines extending in a first direction, wherein an ith first axis signal line thereof is connected to the second ones of the first axis electrodes from an (i−1, 1)th set of the first electrodes to an (i−1, N)th set of the first electrodes and the first ones of the first axis electrodes from a (i, 1)th set of the first electrodes to a (i, N)th set of the first electrodes respectively;
   (N+1) second axis signal lines, with said second axis signal lines extending in a second direction, wherein an jth second axis signal line thereof is connected to the second ones of the second axis electrodes from an (1, j−1)th set of the first electrodes to an (N, j−1)th set of the first electrodes and the first ones of the second axis electrodes from a (1,j)th set of the first electrodes to a (N, j)th set of the first electrodes respectively; and
   a plurality of second signal lines extending along a third direction and connected to the plurality of second electrodes respectively;
   wherein the first direction, the second direction and the third direction are different from each other.

2. The sensing device of claim 1, wherein the at least one reset structure is a soft dielectric sandwiched between the body of the second substrate and the first substrate.

3. The sensing device of claim 1, wherein the second substrate further comprises a plurality of pressing parts, and the at least one reset structure is a plurality of reset structures, and the plurality of reset structures surround each of the plurality of pressing parts, and the plurality of second electrodes are on the plurality of pressing parts.

4. The sensing device of claim 1, wherein the at least one reset structure is a plurality of reset structures, and the plurality of reset structures are sandwiched between the body of the second substrate and the first substrate, and the plurality of reset structures are neighboring to the plurality of second electrodes but do not overlap the plurality of second electrodes.

5. The sensing device of claim 1, further comprising a processing module electrically connected to the plurality of first axis signal lines, the plurality of second axis signal lines, and the plurality of second signal lines, for determining a shift of one of the plurality of second electrodes according to a signal of one of the plurality of first axis signal lines, a signal of one of the plurality of second axis signal lines, and a signal of one of the plurality of second signal lines.

6. The sensing device of claim 5, wherein the processing module further calculates a corresponding force value and a corresponding force direction according to the shift.

7. The sensing device of claim 1, wherein each of the M*N second electrodes is cross-shaped.

* * * * *